United States Patent Office 3,481,342
Patented Dec. 2, 1969

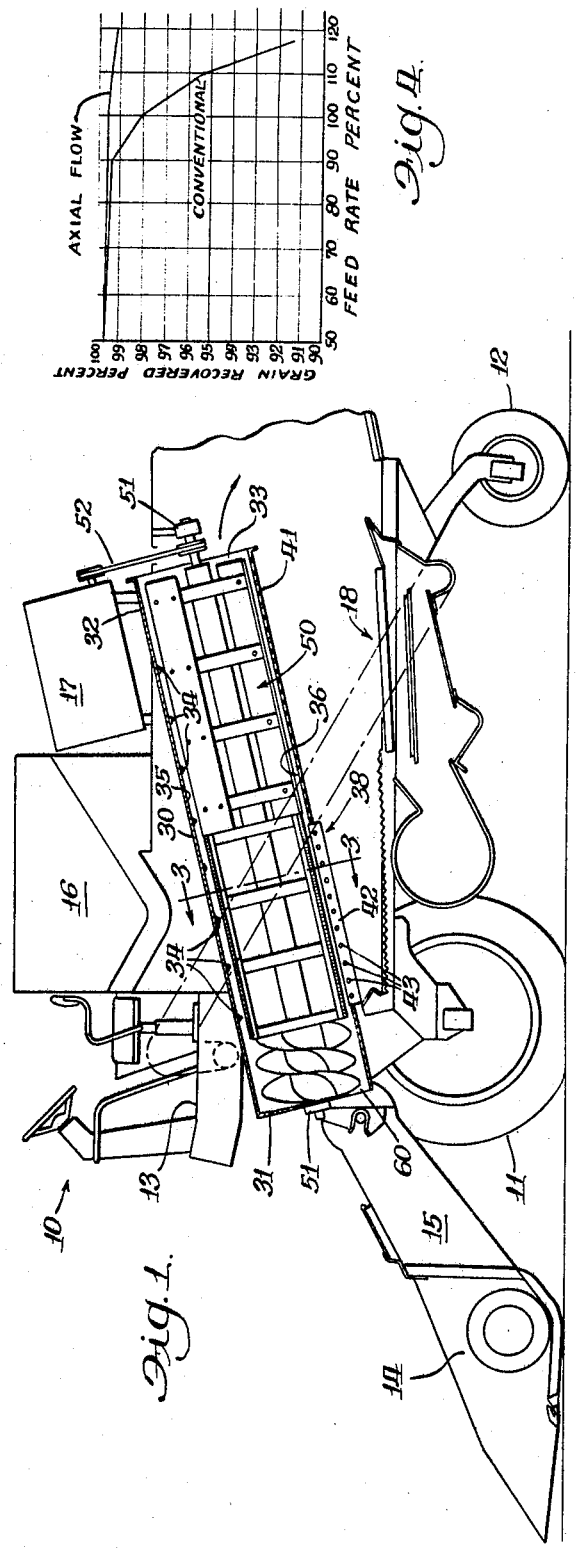
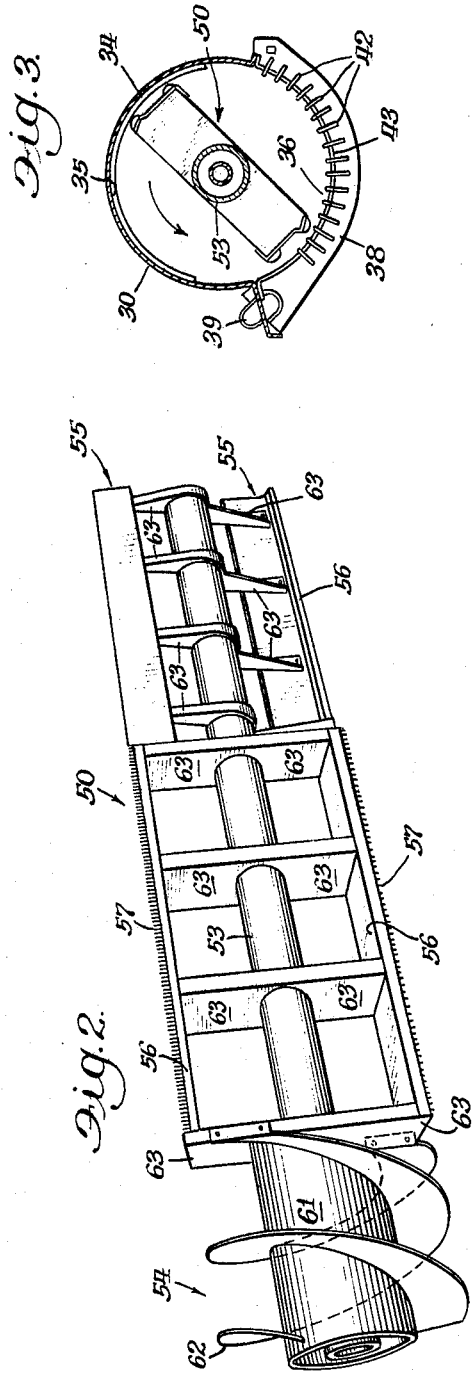

3,481,342
AXIAL FLOW-TYPE COMBINE
Edward William Rowland-Hill, New Holland, Pa., and Richard A. De Pauw and Elof K. Karlsson, East Moline, Ill., assignors to International Harvester Company, Chicago, Ill., a corporation of Delaware
Filed Aug. 30, 1966, Ser. No. 576,151
Int. Cl. A01f *12/24, 7/00;* A01d *41/02*
U.S. Cl. 130—27       8 Claims

ABSTRACT OF THE DISCLOSURE

An axial flow combine having a rotor constructed such that it will minimize the fan effect and thus reduce the amount of dust and fines in the material sample supplied to the cleaning system. The rotor is mounted within an elongated cylindrical casing such that there is a small amount of clearance therebetween.

---

The present invention relates generally to improvements in combines and the like and more particularly to a new and improved rotary or axial flow-type combine in which the material flows axially of an open rotor.

In all present commercially available combines, the material to be threshed is fed between a rotating cylinder and a stationary concave in a direction normal to the axis of the rotating cylinder. Much of the grain contained in the material fed to the cylinder and concave passes through the concave as threshed grain. The remainder of the material is conveyed to the separating component of the combine which in conventional combines includes reciprocating or oscillating straw racks, return pans, and chaffer sieves. The subject invention concerns a combine that operates on a completely different principle than the above-described commercially available combines. In the combine described in the subject application an elongated rotor is provided along the longitudinal axis of the combine. The elongated rotor is enclosed within a cylinder having transport fins provided along its upper internal surface and a concave and grate provided along its lower surface. The material to be threshed is fed into the front end of the cylinder and is metered axially towards the rear while being processed by the cooperating elements on the rotor and cylinder. An axial flow-type combine such as this has the obvious advantage over a conventional combine in the simplicity of its drive since it utilizes only simple rotary drives and does not include oscillating or reciprocating elements. This not only simplifies the drive for the separating section, but also reduces vibrations considerably. Furthermore, the elements of an axial flow-type separating section have better structural stability than those of conventional separating section and are thus more durable and reliable. The principle of constructing a combine in which the material flows axially of the rotor is not entirely new. A threshing machine such as this is shown, for example, in the patent to Schlayer 1,688,662 of Oct. 23, 1928. Although the basic principle is old, machines of this type have never enjoyed commercial success.

One of the reasons for this failure is that an axial flow-type threshing machine requires more power per unit of clean grain than does the conventional combine. With more powerful engines and better drive members now available, this drawback has become less important. The availability of light weight, economical and larger power plants and more efficient power trains has also fostered a trend to build combines of greater capacity. The capacity of machines such as a combine can be increased by providing wider grain heads for the machine so that its swath is increased and also by increasing the forward speed of the combine. Generally speaking, the capacity of the various elements of the combine have been increased to handle the added capacity by merely enlarging them, however, there is a practical limit to how large and how heavy a combine can be built. Combines must be of a size and weight such that they can be operated under soft muddy field conditions. Also, since they must be shipped from the manufacturing plant to the user and since they must be transferred from one field to another, the machine must be of a size and weight that can be conveniently transferred over the highways and by rail. The maximum weight permitted on highways, the maximum width and height of bridges and viaducts that are likely to be encountered, restrict the overall size and weight dimensions of a combine. Once these maximum dimensions have been reached, it is no longer a simple matter to increase the capacity of a combine as it is now necessary to increase the efficiency of the various elements of the combine without a corresponding increase in size or weight.

It has been found that the separating section of the conventional combine has an efficiency curve that changes at a very low rate until the combine feed rate exceeds a set amount. After this point, the efficiency curve of the conventional separating section changes quite steeply. Thus when using a conventional combine and it is desired to keep the grain losses within an acceptable range (for example 2%), it is necessary that the feed rate through the combine must be maintained within the flat portion of the efficiency curve. It has been found that separating units of the axial flow-type construction are more efficient at a given feed rate than are conventional separators at equal feed rates. Also, it has been found that an axial flow-type seprator compares in size and weight to a conventional combine separator.

The grain recovered percent (percent of grain fed into a combine that reaches grain tank) has been plotted against the feed rate percent for the largest combine presently sold by International Harvester Company and also for an axial flow-type combine. The graph is shown as FIGURE 4. The graph illustrates that the grain recovered percent in the conventional and the axial flow-type machines are comparable for feed rates less than 100% of the conventional combine. However, as the feed rate increases beyond this reference point, the percent of grain recovered in the conventional machine changes rapidly while the percent of grain recovered in the axial flow-type changes very little. When the conventional machine is recovering 98% of the grain, it is considered to be operating at 100% of its feed rate. When operating the axial flow-type machine in the same field under identical test conditions at a feed rate equal to what is considered to be 100% of the conventional it recovers 99.4% of the grain. A comparison of these performance curves illustrate that at lower feed rate percents, the difference between the grain recovered percents are less. However, as the feed rate exceeds this reference point, the difference widens rapidly. For example, when the combines are operating at feed rates of 110%, the conventional recovers 95.2% and the axial flow-type recovers 99.3% of the grain. Thus it is seen that the axial flow-type machines are desirable if the feed rates of combines are to be increased.

During threshing and separating, there is created a large amount of light material classified as chaff and fines. In a conventional combine, some of the chaff and fines is discharged with the straw and some is collected with the uncleaned grain. The conventional combine is provided with a cleaning system to separate the chaff and fines from the grain and to deposit the clean grain in the grain tanks. As an example when operating in a field where one half of the crop by weight is grain and the other half is waste, for every 6.4 pounds of material fed into a conventional combine, approximately 2.2 pounds of material will be discharged as waste over the straw walkers and 1 pound of material will be discharged as waste through the cleaning system. The grain tank, in this example, will receive 3.2 pounds of clean grain. In this example 4.2 pounds of material were processed through the cleaning system and 1.0 pound of this was discharged as waste. The cleaning systems on conventional combines are built to handle material having this ratio of waste to clean grain. The effectiveness of conventional combine cleaning systems improve as the ratio of waste to clean grain is decreased or minimized.

Another reason for the failure of the axial flow-type combine as a commercially acceptable machine is now thought to be attributed to its characteristic of separating a larger percentage of chaff with the uncleaned grain than does the conventional combine. As a second example, an axially flow-type combine of the type shown in the above-referred to Schlayer patent, operating in the same field of the first example, might divide every 6.4 lbs. of unthreshed material into 1.6 lbs. of material to be discharged as waste through the straw discharge, and 1.6 lbs. of material as waste through the combine cleaning system. In this second example, 4.8 lbs. of material must be processed through the cleaning system to salvage 3.2 lbs. of clean grain. Thus this machine would require a cleaning system that is more effective than the cleaning system of a conventional combine. For this reason, for an axial flow-type machine to compare favorably with a conventional combine, it must be improved such that it will discharge more of the chaff with the straw and thus not require a more effective cleaning system of a greater capacity than a corresponding conventional combine. It is believed that the rotors in the prior art axial flow-type threshing machine functioned as centrifugal fans creating an air current flowing through the grate located in the bottom portion of the cylinder. This current of air carried with it the light chaff and fines to thus account for the large quantity of chaff and fines received in the cleaning system. It is the purpose of this invention to provide a rotor that will not create a draft flowing through the cylinder grate and thus permit more chaff and fines to be discharged with the straw. This is particularly critical in the threshing area of the rotor since in this portion, the apertures in a grate are larger than in the separating section of the grate. This objective is accomplished by constructing the rotor of a tubular core having a plurality of flat radial arms lying within the plane of rotation. The plurality of flat radial arms are connected at their free ends by elongated members that are parallel to the core. These elongated members are shaped so that they will not function as fan blades. In the separating area, the shape of the elongated members can be such that some fanning effect is obtained.

In the combine disclosed herein, the function of threshing and separating are both performed within the cylinder through the action of the rotor. Conventional rasp bars are mounted axially along the front section of the rotor where the threshing function is performed. By so constructing the threshing and separating section of the combine, there is only one moving part in these sections, the rotor. The drive for rotating the rotor is obviously much simpler than the several drives required in the threshing and separating sections of conventional combines. Thus the machine not only can handle a larger capacity without a corresponding reduction in efficiency but also is simpler and less susceptible to mechanical failures.

An object of the present invention is the provision of an axial flow-type combine having a single rotor that both threshes and separates the grain.

Another object is to provide a rotor for an axial flow-type combine that is open such that it will not produce a centrifugal air current.

Still another object is to provide an open rotor for an axial flow-type combine that includes a spiral feed at the intake end of the rotor.

These and other objects of the invention will become more apparent from the specification and drawings wherein:

FIGURE 1 shows a side view of the axial flow-type combine having portions broken away for clarity.

FIGURE 2 is a pictorial view of a preferred embodiment of the rotor.

FIGURE 3 is a cross-sectional view taken along lines 3—3 of FIGURE 1 of the cylinder and rotor, and FIGURE 4 is a graph comparing performance curves of axial flow and conventional combines.

Referring now to the drawings wherein like reference characters designate like or corresponding parts throughout the several views, there is shown in FIGURE 1, a combine generally designated 10 having drive wheels 11, dirigible wheels 12, an operator's platform 13, a header 14, a feeder 15, a grain storage tank 16, an engine 17, and a conventional cleaning system 18. The combine as seen in FIGURE 1 does not include conventional threshing and separating sections, but rather incorporates the threshing and separating sections into a single unit including an elongated cylindrical member 30 having a rotor 50 mounted therein.

The elongated cylindrical member 30 is arranged along the longitudinal axis of the combine 10 and includes a front end 31 and a rear end 32. Material to be threshed is fed into the elongated cylindrical member 30 through an opening 60 in the front end 31. The material fed into the front end of the cylindrical member 30 is processed as it is metered through the member towards the rear end 32. The threshed grain escapes from the elongated cylindrical member 30 through the apertured bottom made up of a concave 38 and grate 41. The straw and other waste material is discharged from the elongated cylindrical member 30 through a straw discharge opening 33 formed in the rear end 32. A plurality of spiral transport fins 34 are secured to the upper internal surface 35 of the cylindrical member 30. The transport fins function to index the material axially through the cylindrical member from the front end to the rear end.

The lower surface 36 of the elongated cylindrical member 30 has an irregularly shaped internal surface and has apertures formed therein. The apertures are of a size to permit the passage of grain therethrough. The lower surface 36 is divided into a front threshing area that is in the form of a conventional concave and is mounted with adjusting means 39 that will permit the concave 38 to be adjusted relative to the axis of the rotor 50. The adjusting means 39 are conventional and reference is hereby made to the U.S. patent to Moll 2,457,259 of Dec. 28, 1948 for a more complete disclosure. The lower surface 36 also includes a rear separating area including a removable or interchangeable perforated sheet or grate 41 that is normally less aggressive than the concave 38 and has smaller apertures. The concave 38 is of the conventional construction including a plurality of parallel ribs 42 having apertures therein through which a plurality of wires 43 are threaded. The grate 41 is made from a perforated sheet of material and is interchangeable so a grate having the appropriate size apertures can be installed for the particular crop being harvested.

The rotor 50 is journalled for rotation in the elongated cylindrical member 30 by bearings 51 and is drivingly connected to the engine 17 by a drive designated 52. This rotor 50 includes a plurality of blades 55, a tubular core 53 and a short front helix 54 that is secured to the tubular core 53 at its front end. The helix 54 includes a drum 61 and an individual helix flight 62 for each of the blades 55. Thus if the rotor 50 has two blades 55, there will be two separate short front helix flights 62 and if the rotor 50 includes three blades, there will be three short front helix flights 62. Each of the blades 55 of the rotor 50 are made up of a plurality of radially extending arms 63 arranged in groups lying in planes that include the rotor axis. The radially extending arms 63 have free ends that are connected by longitudinally extending members 56. As shown in the illustrations, the longitudinally extending members are divided into two parts, one part extending over the threshing area of the cylindrical member and the second part extending over the separating area of the cylindrical member. The portion of the longitudinally extending member 56 spanning the threshing area of the cylindrical member is shaped such that upon rotation of the rotor, there will be no fanning effect and thus in this area of the cylindrical member, there will be no radial stream of air flowing through the concave 38. The portion of the longitudinally extending member 56 spanning the separating area 41 of the cylindrical member 30 is shown in the drawings to be of a shape that could produce a slight fanning effect since a downdraft of air is less critical in this area. Aggressive means such as conventional rasp bars 57 are secured to the outer surfaces of the longitudinally extending members 56 in the threshing area of the cylindrical member 30. When the rotor 50 revolves, the rasp bars 57 in cooperation with the concave 38 function to thresh the material being fed axially of the rotor 50.

The threshed and separated grain passing through the concave 38 and grate 41, respectively, is then processed through the conventional cleaning unit 18 after which it is elevated and deposited in the grain tank 16.

It should be understood, of course, the foregoing disclosure relates to only a preferred embodiment of the invention and that numerous modifications or alterations may be made therein.

What is claimed is:

1. An axial flow combine including an elongated cylindrical member having a front end and a rear end, spiral transport fins secured to said cylindrical member along its upper internal surface and extending from said front end to said rear end, the lower surface of said cylindrical member being irregular and having apertures formed therein of a size to permit the passage of grain;
   a rotor mounted for rotation about an axis within said cylindrical member and extending from the front to the rear of said cylindrical member, said rotor including;
   a tubular core,
   a short front helix adapted to receive material fed axially into the front end of said cylindrical member and to propel it in a direction axially of and towards the rear of said cylindrical member,
   a plurality of outwardly extending arms, said arms terminating in free ends adjacent the internal surface of said cylindrical member, groups of said outwardly extending arms lying in a plane passing through said rotor axis,
   a longitudinally extending member associated with each of said groups and secured to the free ends of the arms of its associated group, aggressive means secured to the outer surface of said longitudinally extending members; and
   means for driving said rotor.

2. The invention as set forth in claim 1, wherein there is a short front helix associated with each of said groups of outwardly extending arms, said helix being arranged to feed material to its associated group of arms.

3. The invention as set forth in claim 1 wherein said lower surface comprises a front threshing area and a rear separating area;
   said front threshing area comprising a concave that can be adjusted relative to the rotor axis and said rear separating area comprising a removable perforated sheet.

4. The invention as set forth in claim 1 wherein said aggressive means extend along said longitudinally extending members from the front helix and terminate at a point midway of said elongated cylindrical member.

5. The invention as set forth in claim 2 wherein said lower surface comprises a front threshing area and a rear separating area, said front threshing area comprising a concave that can be adjusted relative to the rotor axis and said rear separating area comprising a removable perforated sheet.

6. The invention as set forth in claim 2 wherein said aggressive means extend along said longitudinally extending member from the front helix and terminate at a point midway of said elongated cylindrical member.

7. The invention as set forth in claim 3 wherein said aggressive means extend along said longitudinally extended member only over the front threshing area of said lower surface.

8. The invention as set forth in claim 5 wherein said aggressive means extend along longitudinally extending member only over the front threshing area of said lower surface.

References Cited

UNITED STATES PATENTS

| | | | |
|---|---|---|---|
| 953,833 | 4/1910 | Hollingsworth | 130—27 |
| 1,285,119 | 11/1918 | Gillespie. | |
| 1,174,398 | 3/1916 | Davis | 130—27 |
| 1,744,336 | 1/1930 | Schlayer | 130—27 |
| 2,377,238 | 5/1945 | Jorg | 130—27 |
| 2,457,259 | 12/1948 | Moll | 130—27 |
| 2,682,269 | 6/1954 | Purvis. | |
| 2,745,409 | 5/1956 | Tillotson | 130—27 |
| 2,796,868 | 6/1957 | Oliver | 130—27.85 |

FOREIGN PATENTS 683,727   4/1964   Canada.

LOUIS G. MANCENE, Primary Examiner

P. A. RAZZANO, Assistant Examiner

U.S. Cl. X.R.

56—21